Sept. 14, 1926.
W. P. BULLARD
1,600,037
NUT SORTING APPARATUS
Filed Jan. 30, 1926
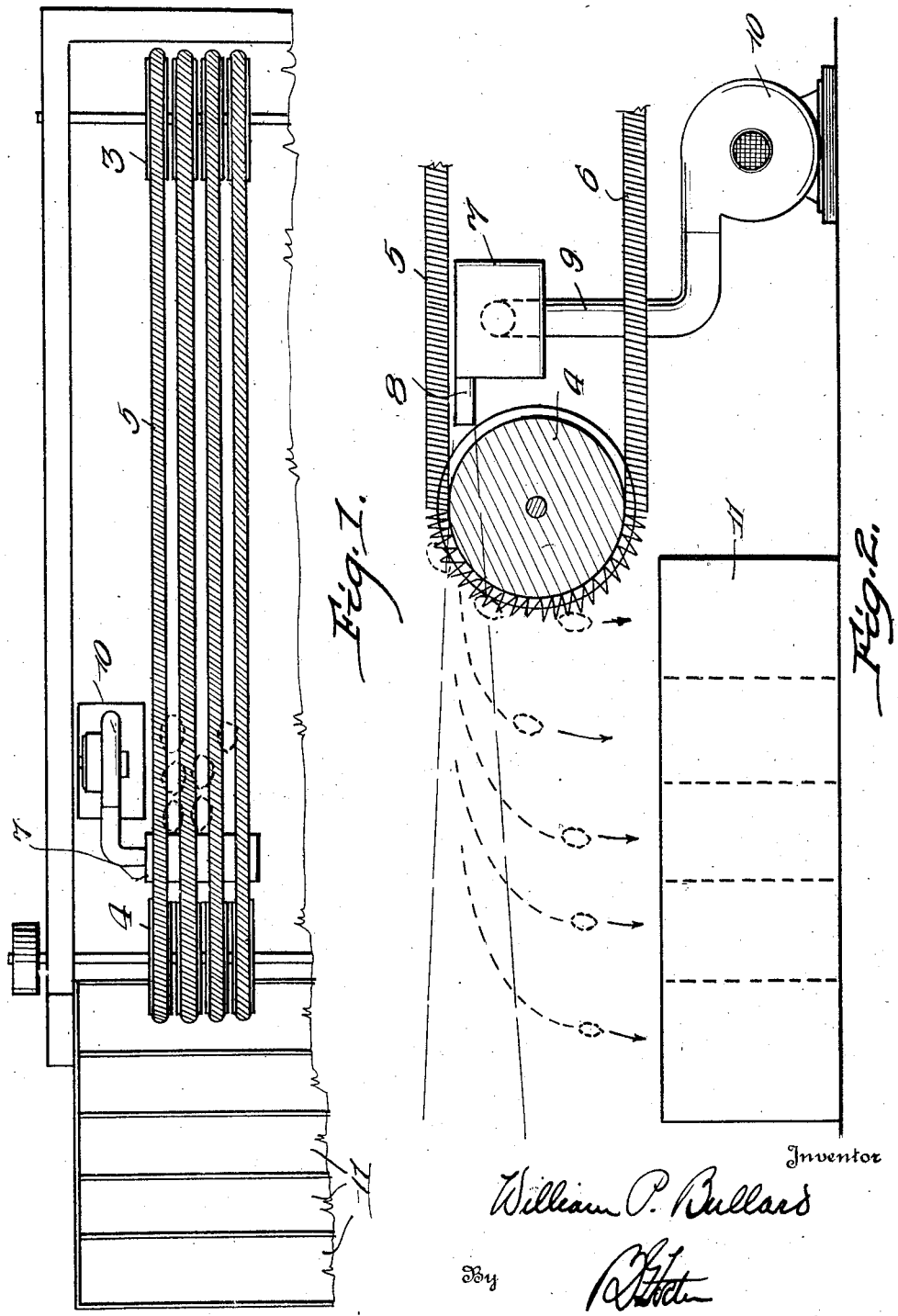

Patented Sept. 14, 1926.

1,600,037

UNITED STATES PATENT OFFICE.

WILLIAM P. BULLARD, OF ALBANY, GEORGIA.

NUT-SORTING APPARATUS.

Application filed January 30, 1926. Serial No. 84,897.

The present invention relates to sorting apparatus, and while particularly intended for nuts, is not necessarily restricted to that specific use. It has been a serious problem heretofore to select plump well filled nuts from those which are "false" or unfilled or those which have shriveled useless meat.

The object of the present invention is to provide simple and effective means by which the good and bad nuts of the above character can be segregated with a reasonable degree of accuracy and with expedition, so that large quantities can be thus sorted at relatively small expense.

In the accompanying drawings:

Figure 1 is a plan view of one embodiment of the invention,

Figure 2 is a detail vertical sectional view of the rear or delivery end of the apparatus shown.

In the embodiment disclosed a series of endless belts are employed, any number desired being available, and four being shown for the purpose of illustration. These belts are preferably hollow, and of coiled spring wire. Their character is fully disclosed in the patent granted to me on May 28, 1925, No. 1,539,349, and need not here be restated. The belts, as shown, are arranged in parallel relation, passing at the receiving end of the machine around the sheaves 3 and at the delivery end around sheaves 4. These belts thus have upper stretches 5 and lower return stretches 6. The stretches 5 are spaced apart a distance slightly less than the diameters of the smallest of the nuts to be operated upon, and these nuts are delivered by any suitable means upon the belts, at or contiguous to the sheaves 3. As they are conveyed toward the delivery end they will assume positions longitudinally of the belts, as indicated, though their relation with respect to these belts is unimportant. As the belts pass around the sheaves 4, obviously they will be carried downwardly therewith.

Interposed between the upper stretches 5 and the lower stretches 6 and directly in rear of the sheaves is an air-blast forming means. This may be an air box 7, having a suitable rearwardly extending outlet or nozzle 8 at its rear upper corner arranged to deliver a blast of air past the upper portions of the sheaves 4 and between the belts. The box is supplied with air under pressure from any suitable source, for example, by a conduit leading from a suitable blower or air pump 10.

In rear of the machine are placed suitable receptacles 11 located at different distances from the sheaves 4.

With this construction, it will be evident that the nuts are all brought into corresponding position, in this case longitudinally of their paths of movement, as they are carried to the delivery end of the machine. Secondly while so positioned they are brought into the path of the blast of air from the outlet or nozzle 8, just as they start to break from or gravitate from the conveyor belts as they turn downwardly around the sheaves 4. This blast of air, which may be varied by any well-known means to a force commensurate with the work to be performed, serves to blow the "false" and lighter nuts out of the normal paths to different distances, as indicated in Figure 2, the lightest and entirely valueless nuts being delivered at points most remote, the partly filled nuts less distances, depending upon their size, while the best full meated plumb nuts pass on downwardly and drop into the box or container directly below the rear sides of the sheaves.

With this construction therefore a grading of nuts or similar articles, depending on their weight and size can be effected, thus eliminating very materially the mixing of false and partly filled nuts with those of first grade quality.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus described my invention, what I claim is:—

1. In a sorting apparatus of the character set forth, the combination with a pair of spaced article carrying supports, of means for projecting a blast of air through the space between the supports to project the articles of lighter weight away from the support.

2. In a sorting apparatus of the character set forth, the combination with a pair of spaced article carrying conveyor belts spaced apart a distance less than the diameters of the articles to be sorted, of means for projecting a blast of air through the space between the belts to project the articles of lighter weight away from the support.

3. In a sorting apparatus of the character set forth, the combination with a pair of conveyor belts having upper article supporting stretches and lower return stretches, of means located between the stretches for projecting a blast of air against the articles carried by the upper stretches to project the articles of lighter weight away from the belts.

4. In a sorting apparatus of the character set forth, the combination with a pair of conveyor belts having upper nut-supporting stretches and lower return stretches, of sheaves around which the belts pass from the upper to the lower stretches, and means for delivering a blast of air between the belts at the said sheaves.

5. In a sorting apparatus of the character set forth, the combination with a pair of conveyor belts having upper nut-supporting stretches and lower return stretches, of sheaves around which the belts pass from the upper to the lower stretches, and means between the upper and lower stretches of the belts for delivering a blast of air between the belts at the upper sides of said sheaves.

6. In a sorting apparatus of the character set forth, the combination with a plurality of hollow belts of coiled wire and sheaves around which they pass, forming upper article-carrying stretches and lower return stretches, said sheaves holding the belts distances apart that are less in width than the diameters of the articles to be carried, of means between the upper and lower stretches and adjacent to the inner sides of the sheaves for delivering a blast of air rearwardly past and away from the upper portions of said sheaves and the portions of the belts passing therearound.

In witness whereof, I affix my signature.

WILLIAM P. BULLARD.